VOLTAGE-CONTROLLED MAGNETIC COUNTING CHAINS

Filed Dec. 11, 1964 2 Sheets-Sheet 1

INVENTOR.
HORST MICHAELIS
BY
Frank R. Trifari
AGENT

VOLTAGE-CONTROLLED MAGNETIC COUNTING CHAINS

Filed Dec. 11, 1964

INVENTOR.
HORST MICHAELIS
BY
Frank R. Jifani
AGENT

United States Patent Office 3,417,257
Patented Dec. 17, 1968

3,417,257

VOLTAGE-CONTROLLED MAGNETIC COUNTING CHAINS

Horst Michaelis, Quickborn, Holstein, Germany, assignor to North American Philips Company, Inc., New York, N.Y., a corporation of Delaware Filed Dec. 11, 1964, Ser. No. 417,587
Claims priority, application Germany, Jan. 30, 1964, P 33,494
11 Claims. (Cl. 307—88)

This invention relates to a magnetic counting chain and is particularly concerned with such chains which comprise memory elements whose state of magnetisation may be changed by voltage pulses.

According to the law of induction a defined voltage-time integral value is required to change the state of magnetisation of a magnetic material having a substantially rectangular hysteresis loop. The state of magnetisation may be changed in incremental steps by sequentially applying small voltage-time integral values to the winding so that a complete change in state of magnetisation is reached in, say $n$ steps. Counters operating on this principle are known and are referred to as magnetic flux counters. The intermediate remanence values achieved on completion of a counting operation are stably maintained without the need for an additional energy supply. However, it is difficult to read the value of the remanence and hence the indication of the counter; this can only be done by a rather laborious method, for example by counting forward or backward up to the remanence point +Br or —Br respectively, the value read out being subsequently read in again. In such a magnetic flux counter the magnitude of the flux in a single element having more than one stable state of magnetisation is changed in incremental steps in each counting operation; the element is preferably a toroid composed of a magnetic material having a substantially rectangular hysteresis loop.

Methods of producing pulse trains are known in which a series arrangement of bistable memory elements is used. These methods are based on the use of magnetic cores having substantially rectangular hysteresis loops and which have diameters or turns numbers whose magnitude increases stepwise within the series arrangement; therefore, different currents are required to change their states of magnetisation. Consequently, with a sawtooth-current control the cores change their states sequentially in time, a voltage pulse train being induced in an output lead threaded through all the cores. The time intervals between the pulses can be varied within certain limits by varying the steepness of the current rise.

It is also known that in the case of voltage control of such a series arrangement a progressive change of magnetisation state is produced so that a voltage pulse is produced in the output winding of each core in a time sequence. In order to ensure that the induced voltage pulses have equal voltage amplitudes and equal duration, it is necessary to use only series circuits of bistable memory elements having magnetic path lengths which increase in steps. For this purpose either a set of toroids having stepwise increasing diameters or suitably apertured ferrite plates are used. The use of such a series arrangement of bistable memory elements as a counting chain is possible since in the case of control with constant voltage-time areas, which are to be considered as the input pulses to be counted, only one element at a time is caused to change its state of magnetisation. However, limits are set to the physical dimensions of the elements.

According to one aspect of the invention, a magnetic counting circuit is provided in which several bistable elements having the same physical characteristics are provided, each comprising a core and an inductively coupled primary winding and secondary winding. The primary windings have equal turns numbers and are connected in series; the secondary windings have sequentially increasing turns numbers and are also connected in series. The individual elements may be caused to sequentially completely change their state of magnetisation by successive voltage pulses applied to the entire sequence of primary windings.

When several elements are used, which may be the case for example, in a decimal counter, then the readability of the indication of the counter is materially improved because within the counting chain each individual element may be caused to completely change its state of magnetisation completely. The progressive change of magnetisation state may be controlled by the amplitude and duration of the applied voltage. The progressive change in magnetisation may be interrupted and resumed at will.

The above and other aspects of the invention will be better understood from the following description of various embodiments thereof when taken with reference to the accompanying diagrammatic drawings, in which.

Figure 1:
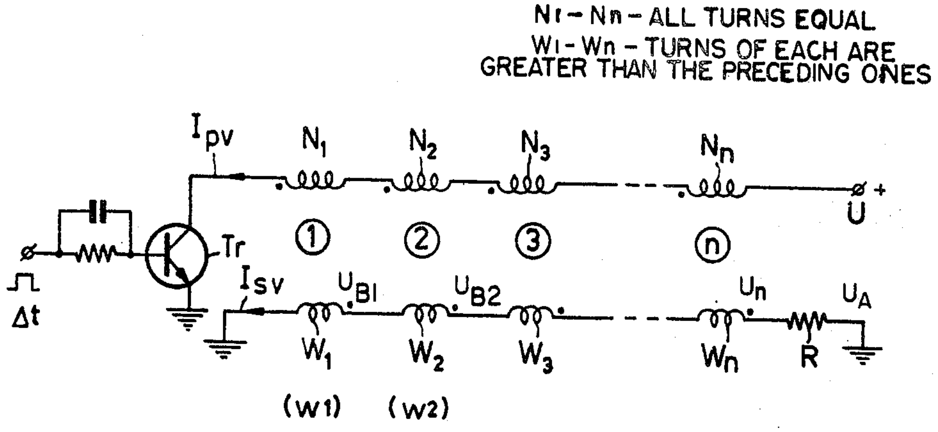
FIG. 1 is a circuit diagram of a series arrangement of $n$ bistable ring cores.

FIG. 1 shows a voltage-time controlled series arrangement of $n$ bistable ring cores or toroids having substantially rectangular hysteresis loops. Primary windings $N_1$—$N_n$ which each have the same number $z$ of turns, and secondary windings $w_1$—$w_n$, which have sequentially increasing number of turns, are connected in series. To ensure that, in counting, sufficient flux differences are produced between the bistable ring cores of the counting chain so that each time only a single element changes state, the series arrangement of the stepped secondary windings may be loaded by a resistor R as shown. It is assumed that the turns numbers of the secondary windings are equal to $w_1 < w_2 < w_3 \ldots < w_n$. If initially all the cores 1 . . . $n$ are in the remanence state 0, then when a transistor switch $Tr$ is closed during a period $\Delta t$ there will occur a secondary step current $I_{s1}$ and a primary step current $I_{p1}$ according to the following equations:

$$I_{s}1 = \frac{w_1 U}{zR}$$

$$I_{p1} = \frac{H_c 1}{z} + \frac{I_{s1} w_1}{z} = \frac{H_c 1}{z} + \left(\frac{w_1}{z}\right)^2 \cdot \frac{U}{R}$$

In these equations, $H_c$ represents the coercive force of the core material and 1 the mean magnetic path length, R the value of a resistance R connected in the secondary circuit and U the voltage U applied to the primary circuit (FIG. 1).

The magnetic fluxes which occur at the first counting pulse, which has a duration $\Delta t^{(1)}$, are:

$$\theta_1^{(1)} = H_c 1$$

$$\theta_2^{(1)} = H_c 1 - (w_2 - w_1) \frac{w_1 U}{zR}$$

$$\theta_3^{(1)} = H_c 1 - (w_3 - w_1) \frac{w_1 U}{zR}$$

etc.

Consequently, if $w_1 < w_2 < w_3 \ldots < w_n$ we have:

$$\theta_1^{(1)}>\theta_2^{(1)}>\theta_3^{(1)} \ldots >\theta_n^{(1)}$$

At the second counting pulse, which has a duration $\Delta t^{(2)}$, the magnetic fluxes are:

$$\theta_1^{(2)}=H_c1-(w_1-w_2)\frac{w_2U}{zR}$$

$$\theta_2^{(2)}=H_c1$$

$$\theta_3^{(2)}=H_c1-(w_3-w_2)\frac{w_2U}{zR}$$

etc.

Since $\theta_2^{(2)}>\theta_1^{(2)}$, no reverse magnetisation of the core 1 occurs.

Figures 2, 6:
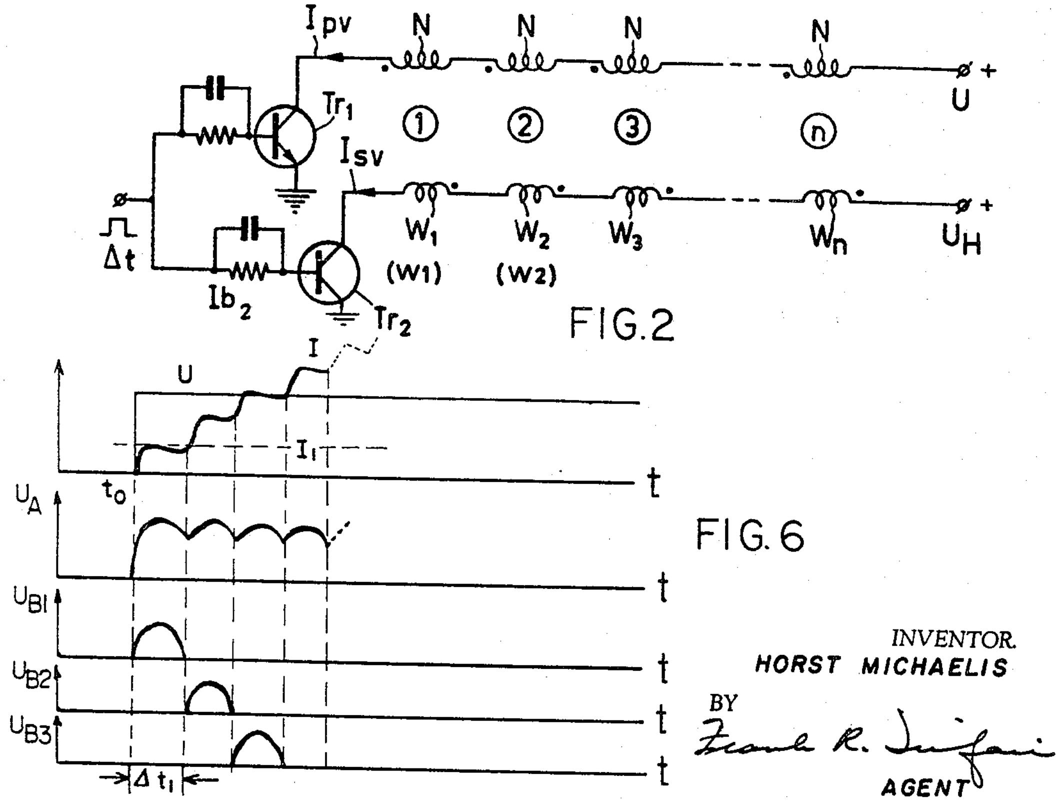
FIG. 2 is a modified embodiment including an additional transistor.
FIG. 6 is a graphical diagram of the voltage and current waveforms utilized in describing the invention.

The above considerations can be shown graphically in FIG. 6, wherein voltage and current curves are shown as a function of time. FIG. 6*a* shows the current I flowing in the series connection of primary windings as the result of the application of the voltage U in a successive series of time intervals starting with the time interval $\Delta t_1$. During the interval $\Delta t_1$, a current $I_1$ flows in the primary windings. During successive intervals, the current is stepped to successively greater values as shown; this is due to the fact that the core states are successively changed and the impedance of the semi-connected primary windings is therefore also successively changed. Due to the step currents in the primary windings, voltages $U_A$ are successively induced in the series connection of the secondary windings. In the first time interval $\Delta t_1$, a voltage pulse $U_{B1}$ will be induced in winding $W_1$ since the first core is the first one to change state. During the second time interval, a voltage pulse $U_{B2}$ will be induced in the second core. This continues until a voltage is induced in winding $W_n$, which is an indication that $n$ input pulses have been applied to transistor T*r*.

When the secondary turns numbers $w_n$ increases stepwise and linearly ($\Delta w$=constant) the primary step current $I_{p\nu}$ increases in square relationship because the secondary step current increases linearly.

We have:

$$I_{s\nu}=\frac{W_\nu \cdot U}{z \cdot R}$$

$$I_{p\nu}=\frac{H_c1}{z}+\left(\frac{W_\nu}{z}\right)^2\cdot\frac{U}{R}$$

In the case of a comparatively large number of ring cores within the counting chain it may be of advantage for the primary step current to rise linearly instead of according to a square law so that the range of the current switched by the transistor is decreased. According to the invention the use of a second transistor $Tr_2$ as shown in FIG. 2 ensures that the current flowing in the secondary circuit remains constant so that with linear increase of the secondary turns numbers the primary current also increases linearly.

The second transistor $Tr_2$ in FIG. 2 acts as a constant current device so that in spite of the increasing voltages induced in the secondary windings there flows an approximately constant secondary current which is determined by the value of the base current $I_{b2}$ and by the current gain factor B.

$$I_{s\nu}\approx I_{b2}\cdot B$$

$$I_{p\nu}\approx\frac{H_c1}{z}+\frac{W_\nu}{z}\cdot I_{b2}\cdot B$$

In FIG. 2 there is also shown an auxiliary voltage source $U_H$ by means of which the influence of the reversible core inductances on the steepness of the edges of the secondary current pulses may be greatly reduced.

Figure 3:
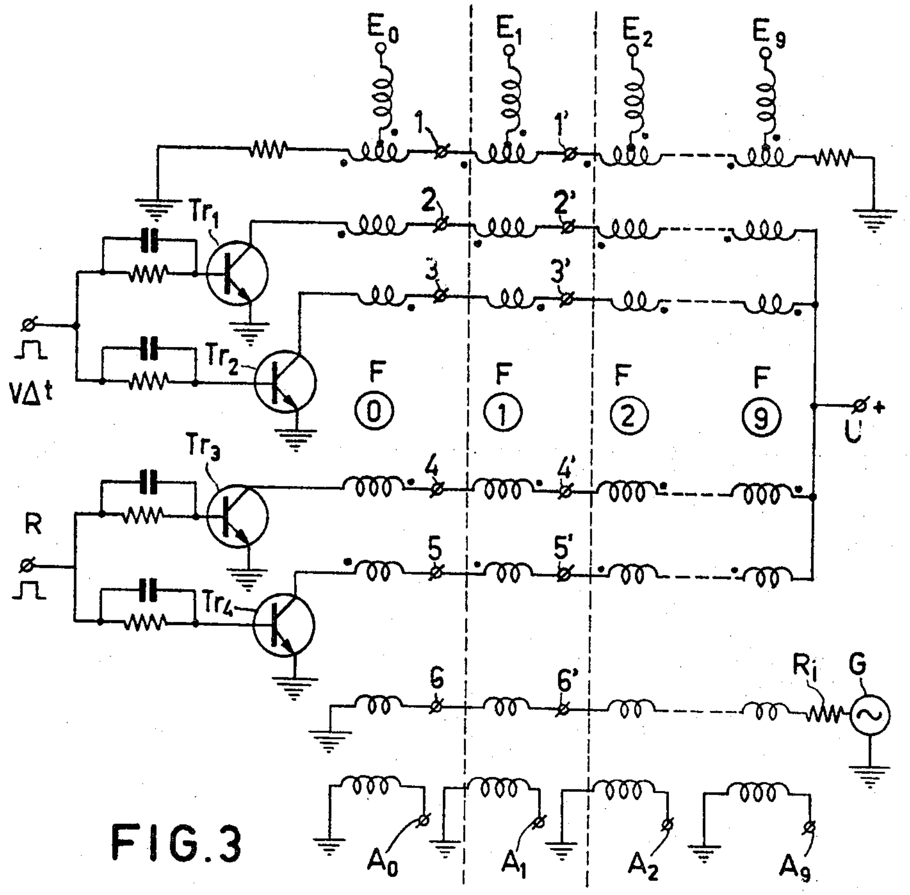
FIG. 3 is a forward and backward counter using transfluxors.

FIG. 3 is the circuit diagram of a decimal counter which operates forward and backward and is equipped with transfluxors so that it may be read out continuously.

Figure 4:
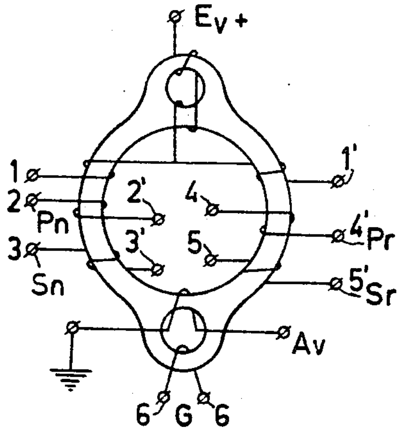
FIG. 4 shows a transfluxor and the associated windings.
Figure 5:
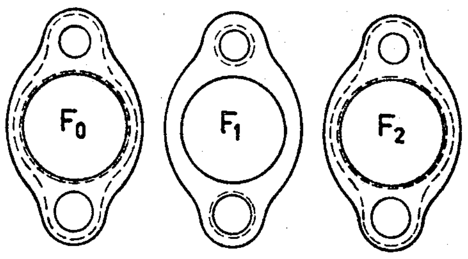
FIG. 5 shows the flux diagrams of the transfluxors.

FIG. 4 shows the arrangement of the windings on a transfluxor, used in FIG. 3, the winding arrangement being the same for all the transfluxors. The counter shown in FIG. 3 is preset by setting a transfluxor $F_1$ and blocking the remaining transfluxors, namely the transfluxor $F_0$ on the left in anticlockwise direction and the transfluxors $F_2$ . . . $F_n$ on the right in a clockwise direction. With due alterations the blocking directions may be interchanged. Setting the transfluxor $F_1$ may be effected, for example, by applying a positive voltage to the input $E_1$ so that the fluxes shown in FIG. 5 are produced in the transfluxors. Reading out is effected by means of an alternating current generator G having a high internal impedance $R_i$. The value of read-out current must be limited to prevent self-setting of the blocked transfluxors. If the counter is preset to the digit 1, an alternating voltage is produced only at an output $A_1$. To perform a counting operation the two associated transistors $Tr_1$ and $Tr_2$ or $Tr_3$ and $Tr_4$ must be closed as switches for the time $\Delta t$, either via a forward input V or via a backward input R. The period $\Delta t$ must be exactly such that the set transfluxor $F_1$ is blocked and subsequently, the transfluxor $F_2$ is set in counting forward or the transfluxor $F_0$ is set in counting backward. The blocking of a set transfluxor, as shown in FIG. 4, requires the same voltage area as the setting of a blocked transfluxor so that the overall voltage time area required for a counting operation is twice as large. This area corresponds to the value required to cause a transfluxor to change from the left blocked state to the right blocked state and vice versa.

Rectangular control voltages having a duration $\Delta t$ for controlling the transistors may be produced by known methods, for example, by means of a monostable multivibrator, which may be triggered by short counting pulses of arbitrary form.

Another advantage of the method of reversing the state of magnetisation in a progressive and localisable manner in accordance with the invention consists in that the counting arrangement shown in FIG. 3 is capable of storing any voltage time area. The switching time $\Delta t$ and the applied voltage U may be continuously varied so that the units counted may be greater or, preferably, smaller than unity.

Hitherto few methods have been described for effecting a continuous time integration of a product of two time functions, for example, a power integral $\int U(t)\cdot I(t)dt$. In analogue computers a method of continuous product formation is frequently used in which the mean value of a pulse train is formed the pulses of which are controlled in amplitude and duration by the quantity to be multiplied. Hence power quantities may be counted by intergrating voltage pulses which have an amplitude corresponding to the voltage to be measured and a duration proportional to the current to be measured by means of a series arrangement of magnetic memory elements according to the invention. The duration of the voltage pulse, which duration must be controlled by the value of the current, may be determined by a known method with the aid of a sawtooth generator and a comparison circuit.

While the invention has been described with respect to specific embodiments, modifications and variations thereof will readily occur to those skilled in the art without departing from the inventive concept, whose scope is set forth in the appended claims.

What is claimed is:

1. A magnetic counting circuit comprising a plurality of magnetic cores composed of material having a substantially rectangular hysteresis loop, primary and secondary windings inductively coupled to each of said cores, all primary windings having the same number of turns, each secondary winding having a number of turns greater than the preceding one, said primary windings being connected in series, said secondary windings being connected in series, and means for applying successive voltage pulses to the series arrangement of primary windings, whereby the state of magnetization of the cores may be sequentially changed.

2. A circuit as recited in claim 1, further comprising a resistor connected in series with said secondary windings.

3. A magnetic counting chain comprising a plurality of magnetic cores composed of material having a substantially rectangular hysteresis loop, primary and secondary windings inductively coupled to each of said cores, all primary windings having the same number of turns, each secondary winding having a number of turns greater than the preceding one, said primary windings being connected in series, said secondary windings being connected in series, means for applying successive voltage pulses to the series arrangement of primary windings, and means connected in series with said secondary windings for maintaining constant current flow in said secondary windings, whereby the state of magnetization of the cores may be sequentially changed.

4. A magnetic counting chain comprising a plurality of magnetic cores composed of material having a substantially rectangular hysteresis loop, primary and secondary windings inductively coupled to each of said cores, all primary windings having the same number of turns, each secondary winding having a number of turns greater than the preceding one, said primary windings being connected in series, said secondary windings being connected in series, first transistor means for applying successive voltage pulses to the series arrangement of primary windings, and second transistor means connected in series with said secondary windings for maintaining constant current flow in said secondary windings, whereby the state of magnetization of the cores may be sequentially changed.

5. A bidirectional magnetic counting chain comprising a plurality of transfluxors composed of material having a substantially rectangular hysteresis loop, primary and secondary windings inductively coupled to each of said transfluxors, all primary windings having the same number of turns, each secondary winding having a number of turns greater than the preceding one, said primary windings being connected in series, said secondary windings being connected in series, and means for applying successive voltage pulses to the series arrangement of primary windings, whereby the state of magnetization of the transfluxors may be sequentially changed.

6. A counting chain as set forth in claim 5, further comprising means for presetting the remanent condition of each transfluxor.

7. A counting chain as claimed in claim 6, wherein said means for presetting comprises an input winding and means for applying a voltage of predetermined polarity to said input windings.

8. A magnetic counting chain as set forth in claim 5, further including at least one additional primary winding, one additional secondary winding, one read-out winding, and a separate output winding inductively coupled to each transfluxor, said additional primary windings, additional secondary windings, and read-out windings being respectively connected in series.

9. A counting chain as set forth in claim 8, further comprising means for presetting the remanent condition of each transfluxor.

10. A counting chain as claimed in claim 9, wherein said means for presetting comprises an input winding and means for applying a voltage of predetermined polarity to said input winding.

11. A magnetic counting chain comprising a plurality of magnetic cores composed of material having a substantially rectangular hysteresis loop, primary and secondary windings inductively coupled to each of said cores, all primary windings having the same number of turns, each secondary winding having a number of turns greater than the preceding one, said primary windings being connected in series, said secondary windings being connected in series, and means for applying successive voltage pulses to the series arrangement of primary windings with an amplitude which corresponds to the instantaneous value of a substantially continuous voltage and with a duration which is proportional to the instantaneous value of a substantially continuous current.

References Cited

UNITED STATES PATENTS

| | | | |
|---|---|---|---|
| 2,913,596 | 11/1959 | Ogle | 307—88 |
| 2,962,704 | 11/1960 | Buser | 307—88 |
| 3,077,583 | 2/1963 | Russell | 307—88 |
| 3,103,593 | 10/1963 | Woodland | 307—88 |
| 3,114,896 | 12/1963 | Carey | 340—174 |
| 3,132,335 | 5/1964 | Kahn | 307—88 |
| 3,162,843 | 12/1964 | Cattermole | 307—88 |
| 3,199,088 | 8/1965 | Paivinen | 340—174 |

STANLEY M. URYNOWICZ, Jr., *Primary Examiner.*